(12) United States Patent
Schofield

(10) Patent No.: US 6,253,252 B1
(45) Date of Patent: *Jun. 26, 2001

(54) METHOD AND APPARATUS FOR ASYNCHRONOUSLY CALLING AND IMPLEMENTING OBJECTS

(76) Inventor: Andrew Schofield, Lindenbuehl 27, Cham (CH), CH-6330

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/680,202

(22) Filed: Jul. 11, 1996

(51) Int. Cl.[7] ........................................ G06F 9/00
(52) U.S. Cl. ............................................... 709/315
(58) Field of Search ................... 709/300–305, 709/310–332

(56) References Cited

U.S. PATENT DOCUMENTS 5,481,721 * 1/1996 Serlet et al. ......................... 395/680
5,822,563 * 10/1998 Sitbon et al. .

OTHER PUBLICATIONS

Walker et al, "Asynchronous remote operation execution in distributed systems", IEEE Electronic library, 1990.*

Lin et al; "an asynchronous remote procedure call system for heterogeneous programming", IEEE Electronic library, 1991.*

Menon et al, Object Replacement Using Dynamic Proxy Updates.*

Menon et al., Asynchronous Events: Tools for Distributed Programming in Concurrent Object Based Systems, 1993.*

OMG, Object Transaction Service 1994.*

OMG, ORB Products, Chapter 21, pp. 299–326, 1995.*

Hall et al; Windows Sockets an Open Interface for Network Programming Under Microsoft Windows, Jan. 20, 1993.*

\* cited by examiner

*Primary Examiner*—Majid A. Banankhah
*Assistant Examiner*—Pat Caldwell
(74) *Attorney, Agent, or Firm*—Thompson & Knight, LLP

(57) ABSTRACT

A method and apparatus for asynchronously calling and implementing objects is disclosed. Object calls to perform an operation are performed asynchronously by calling the appropriate stub function from the client application and passing in the object reference, input parameters, and a pointer to a completion routine. The object reference, input parameters, and completion routine address are provided to a client-side execution environment. The client-side execution environment stores the completion routine address and transmits the input parameters to a server-side execution environment. The server-side execution environment calls a method in the server application that implements the requested operation. The server application performs the requested operation. Once the call has been responded to, the client-side execution environment calls the completion routine and passes it the output parameters to the requested operation. The client application can continue performing other asynchronous operations before the completion routine is called. To asynchronously implement an object that has been called, the appropriate method function in the server application is called which, in turn, calls an asynchronous operation. Once the asynchronous operation returns, the application responds to the client application.

12 Claims, 10 Drawing Sheets

SYNCHRONOUS OBJECT CALL/
SYNCHRONOUS IMPLEMENTATION

ASYNCHRONOUS OBJECT CALL/
SYNCHRONOUS IMPLEMENTATION

```
# include "intf.h"                                             ~701

Client Init ([Client Init parameters])                         ~702

{
    sts = CEE_CFG_GET (Objref,&objref);                        ~703
    sts = TIM_ifc_(&intf);                                     ~704
    sts = CEE_PROXY_CREATE (objref,&intf,&proxy);              ~705
    sts = CEE_PROXY_CREATE (objref,&intf,&proxy1);             ~706
    sts = TIM_NOW_pst_(&proxy, LOCAL_TIME_TAG, GotTime, LOCAL);~707
    sts = TIM_NOW_pst(&proxy1,GMT_TAG,GotTime,GMT); }          ~708

~709
GotTime   (
        In  cmptag_
        In  *exception_
        In  timeStr)
                   ~710
        {
        switch(cmptag_)
                case LOCAL_TIME_TAG:       ~711
                                                        ~712
                    printf("Local time is &%s\n", timeStr);
                    break;
                case GMT_TAG:   ~713
                                                   ~714
                    printf("GMT is %s\n", timeStr);
                    break;
        }
```

FIG. 7

```
ImplInit ([ImplInit parameters])  ~901

{
    sts = TIM_ifc_(&intf); ~902
    sts = CEE_IMPLEMENTATION_CREATE (&intf, implementationHandle); ~903
    ssts = TIM_Now_ams (implementationHandle, NowMethod); ~904

NowMethod (
            objtag,
            call_id,
            timeZone)
    { timeptr= (timeZone == GMT) ? gmtime (&t): localtime (&t); ~905
        strftime (context ->timeStr, sizeof (context->timestr), ~906
        "%H"%M:%S", timeptr); ~907
        context_callid = *call_id_; ~908
        sts = CEE_TIMER_CREATE (1,0,TimerExpired, context, &timerHandle);
    }                                                                    ⌣
                                                                        909

TimerExpired (context)                                              910
    {
            sts = Tim_Now_Res_(&context->callId, &exception,context ->timestr);
    }
```

FIG. 9

ASYNCHRONOUS IMPLEMENTATION WITH
MEMORY ALLOCATION

METHOD AND APPARATUS FOR ASYNCHRONOUSLY CALLING AND IMPLEMENTING OBJECTS

BACKGROUND OF THE INVENTION

RELATED APPLICATION

The following related U.S. applications are hereby incorporated by reference: U.S. application Ser. No. 08/680,270 entitled "Method and Apparatus for Describing an Interface Definition Language-Defined Interface, Operation, and Data Type" by A. Schofield, filed Jul. 11, 1996; U.S. application Ser. No. 08/678,681 entitled "Method and Apparatus Using Parameterized Vectors For Converting Interface Definition Language-Defined Data Structures into a Transport and Platform Independent Format" by A. Schofield, filed Jul. 11, 1996; U.S. application Ser. No. 08/678,298 entitled "Data Structure Representing An Interface Definition Language Source File" by A. Schofield, filed Jul. 11, 1996; U.S. application Ser. No. 08/680,203 entitled "Method and Apparatus for Transporting Interface Definition Language-Defined Data Structures Between Heterogeneous Systems" by A. Schofield, filed Jul. 11, 1996; U.S. application Ser. No. 08/678,295 entitled "Method and Apparatus for Performing Distributed Object Calls" by A. Schofield filed Jul. 11, 1996; U.S. application Ser. No. 08/680,266 entitled "Method and Apparatus for Performing Distributed Object Calls using Proxies and Memory Allocation" by A. Schofield filed Jul. 11, 1996.

1. Field of the Invention

The present invention relates to a method and apparatus for making asynchronous object calls and asynchronous object implementations in client applications and server applications, respectively.

2. Background

Distributed object computing combines the concepts of distributed computing and object-oriented computing. Distributed computing consists of two or more pieces of software sharing information with each other. These two pieces of software could be running on the same computer or on different computers connected to a common network. Most distributed computing is based on a client/server model. With the client/server model, two major types of software are used: client software, which requests the information or service, and server software, which provides or implements the information or service.

Object-oriented computing is based upon the object model where pieces of code called "objects"—often abstracted from real objects in the real world—contain data (called "attributes" in object-oriented programming parlance) and may have actions (also known as "operations") performed on it. An object is defined by its interface (or "class" in C++ parlance). The interface defines the characteristics and behavior of a kind of object, including the operations that can be performed on objects of that interface and the parameters to that operation. A specific instance of an object is identified within a distributed object system by a unique identifier called an object reference.

In a distributed object system, a client application sends a request (or "object call") to a server application. The request contains an indication of the operation to be performed on a specific object, the parameters to that operation, the object reference for that object, and a mechanism to return error information (or "exception information") about the success or failure of a request. The server application receives the request and carries out the request via a server "implementation." The implementation satisfies the client's request for an operation on a specific object. The implementation includes one or more methods, which are the portions of code in the server application that actually do the work requested of the implementation. If the implementation is carried out successfully, the server application returns a response to the client, if necessary. The server application may also return exception information.

To standardize distributed object systems, the Object Management Group ("OMG"), a consortium of computer software companies, proposed the Common Object Request Broker Architecture ("CORBA"). Under the CORBA standard, an Object Request Broker ("ORB") provides a communication hub for all objects in the system passing the request to the server and returning the response to the client. Commercial ORB's are known in the art and a common type is IBM's System Object Model ("SOM"). On the client side, the ORB handles requests for the implementation of a method and the related selection of servers and methods. When a client application sends a request to the ORB for a method to be performed on an object, the ORB validates the arguments contained in the request against the interface for that object and dispatches the request to the server application, starting the server application if necessary. On the server side, the ORB uses information in the request to determine the best implementation to satisfy the request. This information includes the operation the client is requesting, what type of object the operation is being performed on, and any additional information stored for the request. In addition, the server-side ORB validates each request and its arguments. The ORB is also responsible for transmitting the response back to the client.

Both the client application and the server application must have information about the available interfaces, including the objects and operations that can be performed on those objects. To facilitate the common sharing of interface definitions, OMG proposed the Interface Definition Language ("IDL"). IDL is a definitional language (not a programming language) that is used to describe an object's interface; that is, the characteristics and behavior of a kind of object, including the operations that can be performed on those objects and the parameters to those operations.

IDL is designed to be used in distributed object systems implementing OMG's CORBA Revision 2.0 specification, which is incorporated by reference herein. In a typical system implementing the CORBA specification, interface definitions are written in an IDL-defined source file (also known as a "translation unit"). The source file is compiled by an IDL compiler that generates programming-language-specific files, including client stub files, server stub files, and header files. Client stub files are language-specific mappings of IDL operation definitions for an object type into procedural routines, one for each operation. When compiled by a language-specific compiler and linked into a client application, the stub routines may be called by the client application, for example, to formulate a request. Similarly, the server stub files are language-specific mappings of IDL operation definitions for an object type (defined by an interface) into procedural routines. When compiled and linked into a server application, the server application can call these routines when a corresponding request arrives. Header files are compiled and linked into client and server applications and are used to define common data types and structures.

In general, computer systems use one of three communication styles: (1) One-way communication; (2) Synchronous Communication; and (3) Asynchronous communication. If a client application in a distributed object system invokes a one-way request, the application sends the request and continues with other work without checking to see if the request was completed. The request truly would go only one way; the application sends the request to the server, but nothing ever returns from the server. If a client application invokes a synchronous communication request, the application transfers control to the ORB and cannot do anything until the request completed or failed. Synchronous communication are most appropriate when, an application needed to send and complete requests in a certain order and the operations were of short duration. If an application invokes an asynchronous object call, the application does not wait for the request to complete before it continued with other work. In time-critical situations, asynchronous communication is the preferred style for object calls. Similarly, the implementations of objects in server applications could benefit if asynchronous communication were efficiently supported.

Unfortunately, conventional distributed object systems do not support true asynchronous communication for object calls from a client application. For instance, the CORBA specification offers "deferred synchronous communication." In deferred synchronous communication, a requesting application periodically checks to see if the request has completed by continuously polling using the CORBA_Request_get_response operation or the CORBA_next_response routine. This process is time-consuming and lacks the benefits of true asynchronous communication.

Moreover, conventional distributed object systems support "threads" which are streams of execution that branch off from a process to handle asynchronous operations. Threaded execution, however, has its own disadvantages such as the inconvenience of having to synchronize access to common data, overall performance loss, and platform dependence.

Accordingly, there is a need for a method and apparatus for performing true asynchronous object calls within a distributed object system.

Moreover, there is a need for a method and apparatus for performing asynchronous object implementations without the use of threaded execution.

SUMMARY OF THE INVENTION

The present invention provides a method and apparatus for performing asynchronous object calls. The present invention also satisfies the need for a method and apparatus for performing non-threaded asynchronous object implementations.

In a preferred embodiment, the method for performing asynchronous object calls of the present invention involves invoking an operation on an object by calling a stub function from a client application. The client application provides the stub function with the input parameters to the operation along with a pointer to a completion routine. The invocation is sent to a server application using an execution environment common to the client and server application. The server application implements the operation on the object and provides a response to the execution environment. Once the operation has been implemented by the server application, the execution environment calls the completion routine with the operation's output parameters. The completion routine should also determine whether or not the object call was successful.

Implementations can be performed asynchronously as well. During an asynchronous implementation, a client application requests that an operation be performed on an object (the request may be made synchronously or asynchronously as stated above). The request is transmitted to a server application by an execution environment accessible by both the client and the server applications. When the request is transmitted, the server application associates the call with a call identifier. If an asynchronous method is called from the server application, the server application passes the call identifier and the address to a response function to the asynchronous method. The asynchronous operation completes and calls the response function which, in turn, responds to the caller.

By using these "callback" functions ("completion routine" and "response function"), both the client and server applications can continue doing other work without waiting within a particular function. Moreover, by permitting both client and server to execute asynchronously, different invocation styles may be used to suit a particular task. For instance, an object call may be performed asynchronously while its implementation is performed synchronously, and vice-versa, thus providing greater flexibility to the developer.

A more complete understanding of the method and apparatus for asynchronously calling objects will be afforded to those skilled in the art, as well as a realization of additional advantages and objects thereof, by a consideration of the following detailed description of the preferred embodiment. Reference will be made to the appended sheets of drawings which will first be described briefly.

BRIEF DESCRIPTION OF THE DRAWINGS

FIG. 7 is a section of programming code performing an asynchronous object call.

FIG. 9 is a section of programming code performing an asynchronous object implementation.

DETAILED DESCRIPTION OF THE PREFERRED EMBODIMENT

Reference will now be made in detail to the preferred embodiments of the invention, examples of which are illustrated in the accompanying drawings. Wherever possible, the same reference numbers will be used throughout the drawings to refer to the same or like parts.

I. System Overview

Figure 1:
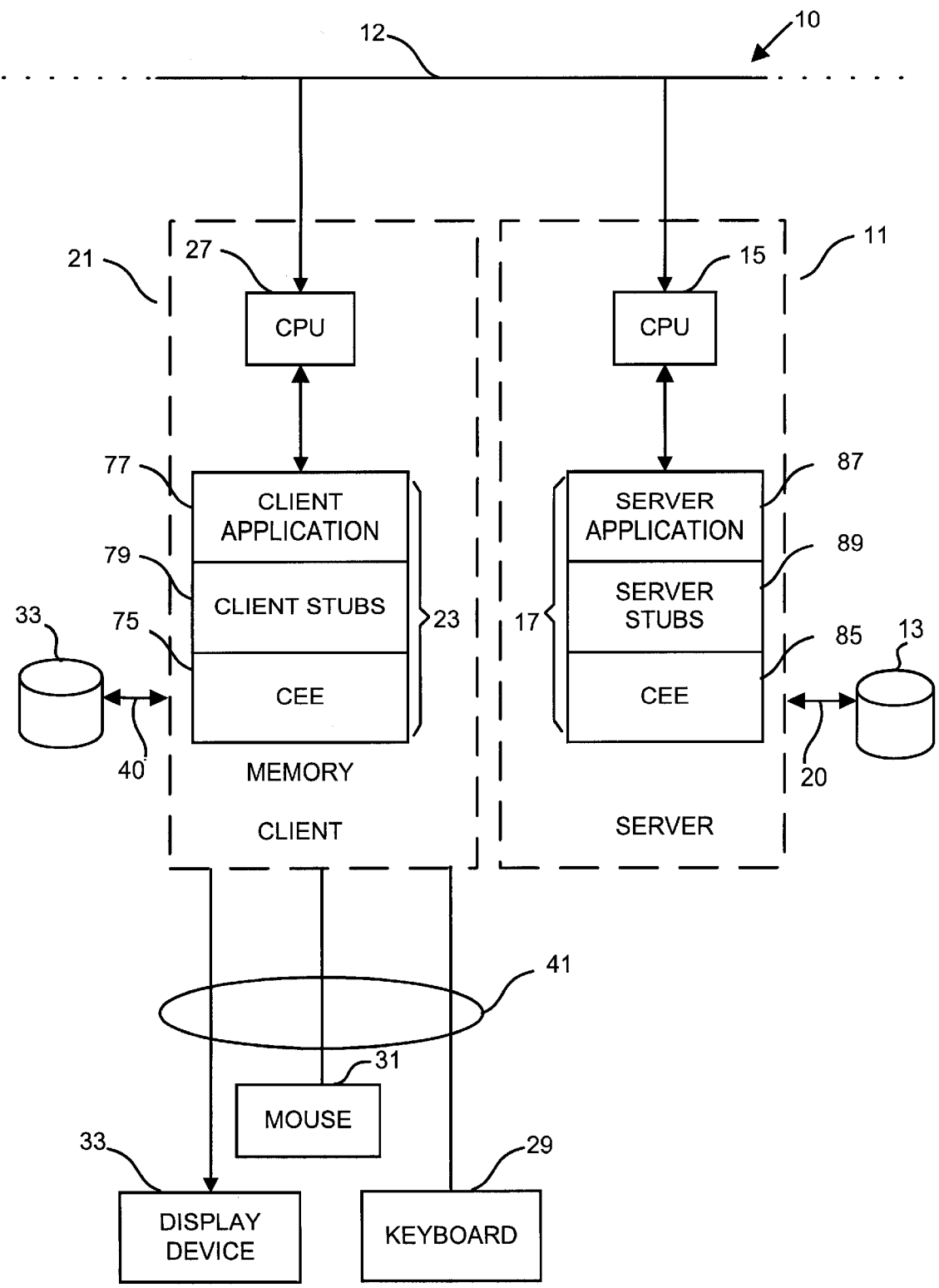
FIG. 1 is a block diagram of a client/server computing system utilizing the method of the present invention.

As illustrated in FIG. 1, the method of the present invention is designed for use in a distributed (client/server) computing environment 10. The client and server systems are connected by network connections 12, such as Internet connections or the connections of a local area network. A server computer 11 communicates over a bus or I/O channel 20 with an associated disk storage subsystem 13. The server system 11 includes a CPU 15 and a memory 17 for storing current state information about program execution. A portion of the memory 17 is dedicated to storing the states and variables associated with each function of the program which is currently executing on the server computer. A client computer 21 similarly includes a CPU 27 and associated memory 23, and an input device 29, such as a keyboard, or a mouse 31 and a display device 33, such as a video display terminal ("VDT"). The client CPU 27 communicates over a bus or I/O channel 40 with a disk storage subsystem 33 and via I/O channel 41 with the keyboard 29, VDT 42 and mouse 31.

The client memory 23, preferably, includes a client application 77 that is linked to client stubs 79 (as discussed below) and loaded therein. Similarly, the server memory 17 includes a server application 87 linked to server stubs 89. In addition, both the client memory and the server memory include an execution environment ("CEE") 75, 85 (as discussed below).

The client/server model as shown in FIG. 1 is merely demonstrative of a typical client/server system. Within the context of the present invention, the "client" is an application that requests that operations be performed on an object while the "server" is an application that implements the operation on the object. Indeed, both the client and server application may reside on the same computer and within a common capsule, as discussed below. Most likely, however, the client and server application will reside on separate computers using different operating systems. The method of the present invention will be discussed with reference to two capsules running on separate machines.

II. Distributed Computing Environment

The method and apparatus of the present invention may be utilized within any distributed computing environment. In a preferred embodiment, the Common Execution Environment ("CEE") 75, 85, which is a component of the Tandem Message Switching Facility ("MSF") Architecture, is used. The CEE activates and deactivates objects and is used to pass messages between client and server applications loaded in CEE capsules. The CEE may be stored in the memory of a single machine. More likely, however, the CEE and client and server applications will be loaded on multiple machines across a network as shown in FIG. 1. The client-side CEE 75 is stored in the client memory 23. The server-side CEE 85 is stored in server memory 17.

Figure 2A:
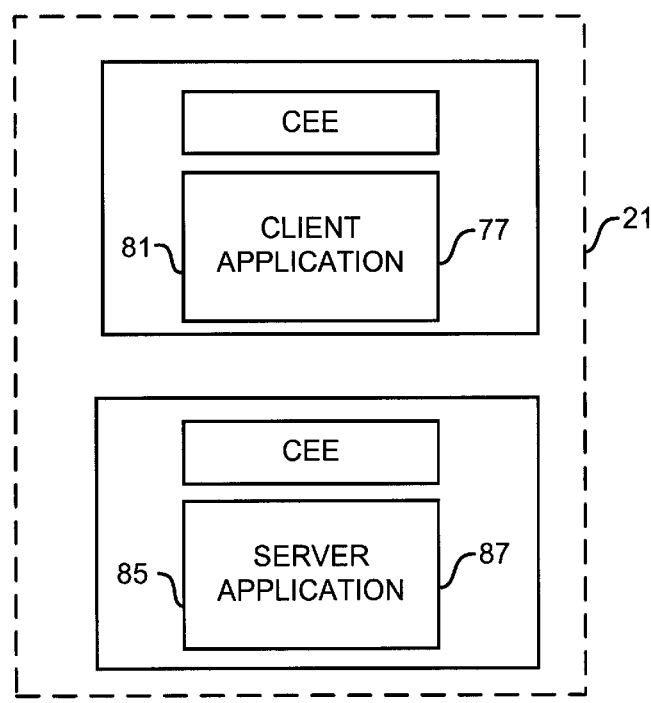
FIGS. 2a and 2b are diagrams of alternative configurations for Common Execution Environment capsules.
Figure 2B:
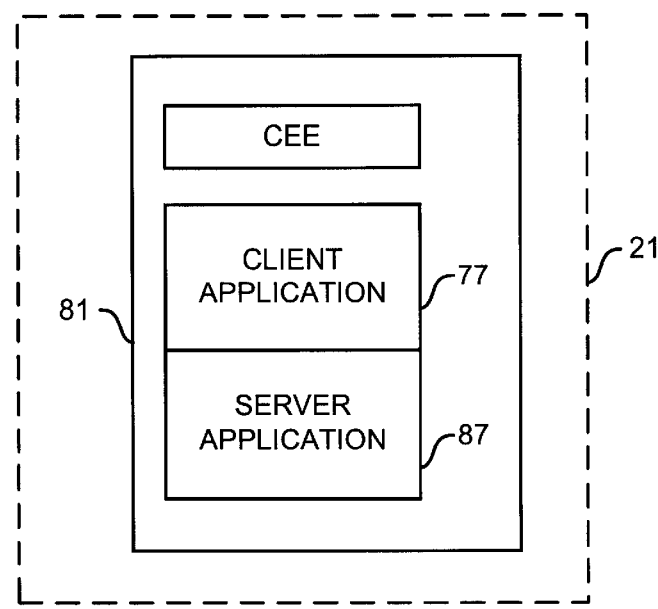

The CEE uses a "capsule" infrastructure. A capsule encapsulates memory space and one or more execution streams. A capsule may be implemented differently on different systems depending upon the operating system used by the system. For instance, on certain systems, a capsule may be implemented as a process. On other systems, the capsule may be implemented as a thread. Moreover, client and server applications may be configured within different capsules contained on different machines as shown in FIG. 1. Alternatively, the different capsules may be configured as shown in FIG. 2. FIG. 2a shows a client application 77 loaded in a single capsule 48 and a server application 87 may be loaded in a separate capsule 50. Both capsules, however, are stored on the same machine 44. Both the client and server applications may also be loaded within a single capsule 81 on the same machine 46 as shown in FIG. 2b. As stated above, the method of the present invention will be described with reference to the multiple capsule, multiple machine case. Accordingly, the client 12 and server machine 11 include a client-side CEE 75 and a server-side CEE 85 loaded in their respective memories.

Figure 3:
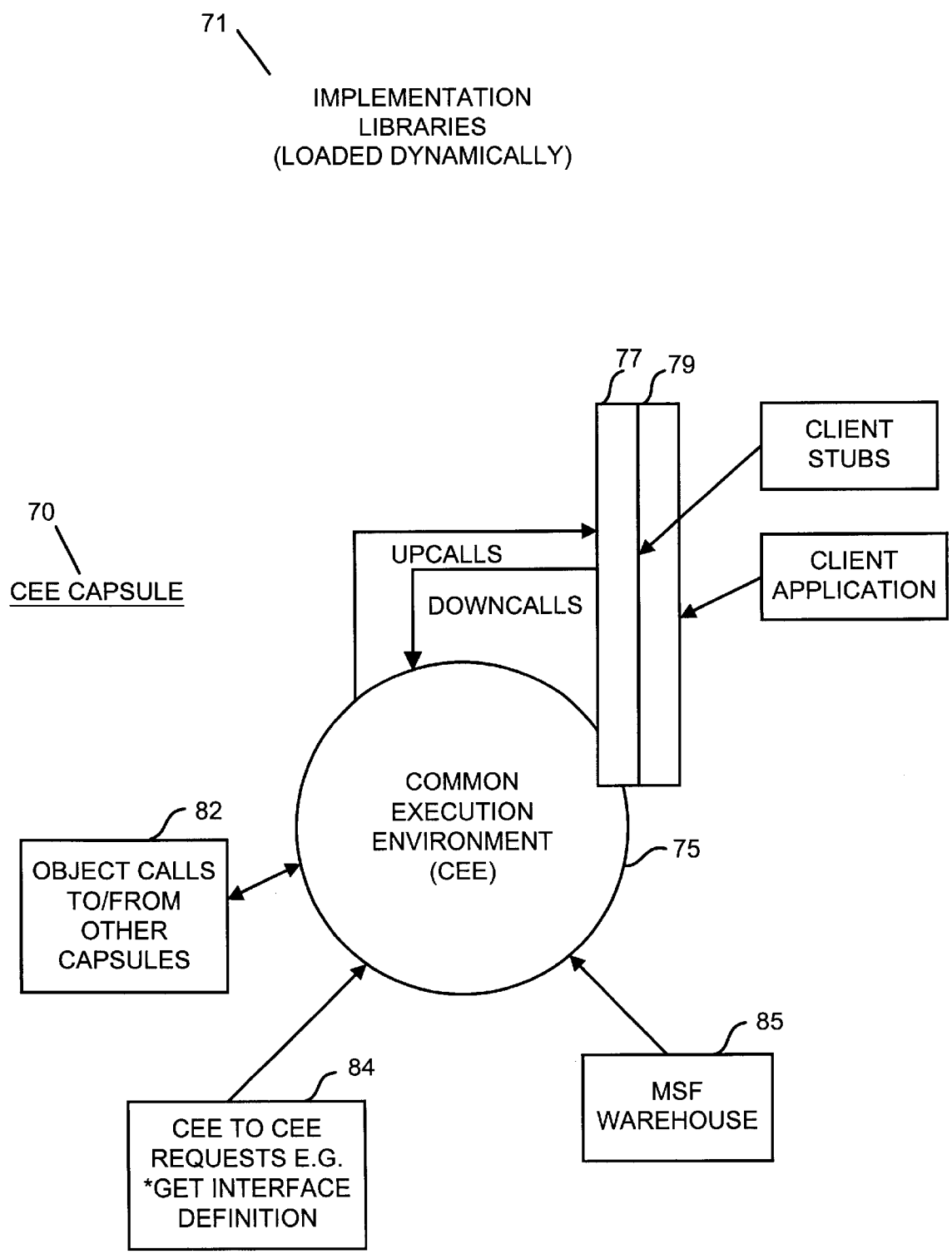
FIG. 3 is a diagram of a Common Execution Environment capsule and its core components.

FIG. 3 shows a CEE capsule 70 contained, for example, in a client computer memory 27 (not shown) that includes the CEE 75 and certain of the core CEE components and implementations of objects contained within Implementation Libraries 71. The Implementation Libraries 71 include the client application 77 (or the server application in the case of the server capsule) and client stubs 79 (or server stubs) generated from the IDL specification of the object's interface, as described below. The Implementation Libraries 71 and the CEE 75 interact through the down-calling of dynamically-accessible routines supplied by the CEE and the up-calling of routines contained in the Implementation Library. The CEE 75 can also receive object calls 82 from other capsules within the same machine and requests 84 from other CEE's. The client-side CEE 75 and the server-side CEE 85 may communicate using any known networking protocol.

Objects implemented in a CEE capsule may be configured or dynamic. Configured objects have their implementation details stored in a repository (such as the MSF Warehouse 85) or in initialization scripts. Given a request for a specific object reference, the CEE 75 starts the appropriate capsule based on this configuration data. The capsule uses the configuration data to determine which Implementation Library to load and which object initialization routine to call. The object initialization routine then creates the object. Dynamic objects are created and destroyed dynamically within the same capsule. Dynamic objects lack repository-stored or scripted configuration information.

The following paragraphs describe a system-level view of how the Implementation Libraries interact with the CEE 75. The CEE 75 implements requests to activate and deactivate objects within a capsule. In addition, the CEE facilitates inter-capsule object calls 82 as well as requests from other CEE's 84, as discussed above. Object activation requests arise when an object call from a client or server application must be satisfied. To activate an object, the CEE loads the appropriate Implementation Library (if not already loaded) containing the object's methods and then calls a configured object initialization routine contained in the Implementation Libraries, as discussed below. The initialization routine specifies which interface the Implementation Libraries support and registers the entry points of the object's methods to be called by the CEE at a later time.

When the client and server systems start, both the client-side and server-side CEE's run their own initialization. This initialization tells client and server CEE's where to locate the various Implementation Libraries. Once located by the CEE, the CEE calls the initialization routines in the client and server applications. The initialization routines contained in the client and server applications must first carry out any required application-specific initialization. Next, both the client and server initialization routines call a generated stub function which, in turn, down-calls a CEE function (contained in a dynamic library as stated above) called CEE_INTERFACE_CREATE to specify the object's interface. An interface may be specified for each object. The interface description is normally generated from an IDL description of the interface, as discussed below. CEE_INTERFACE_CREATE creates an interface and returns an "interface handle" to the newly created interface. The handle is a unique identifier that specifies the interface. The server application initialization routine then uses the interface handle to down-call CEE_IMPLEMENTATION_CREATE. CEE_IMPLEMENTATION_CREATE creates an implementation description that can be used by one or more objects. CEE_IMPLEMENTATION_CREATE returns an "implementation handle" that is a unique identifier specifying the implementation for each operation in the interface. Finally, the server application initialization routine uses the implementation handle to call a stub function which down-calls CEE_SET_METHOD. CEE_SET_METHOD specifies the actual addresses of specific method routines of the implementation as contained in the server application. The CEE then has sufficient information to connect object calls in the client application to specific methods in the server application.

III. Compiling and Linking IDL Source Files

Figure 4:
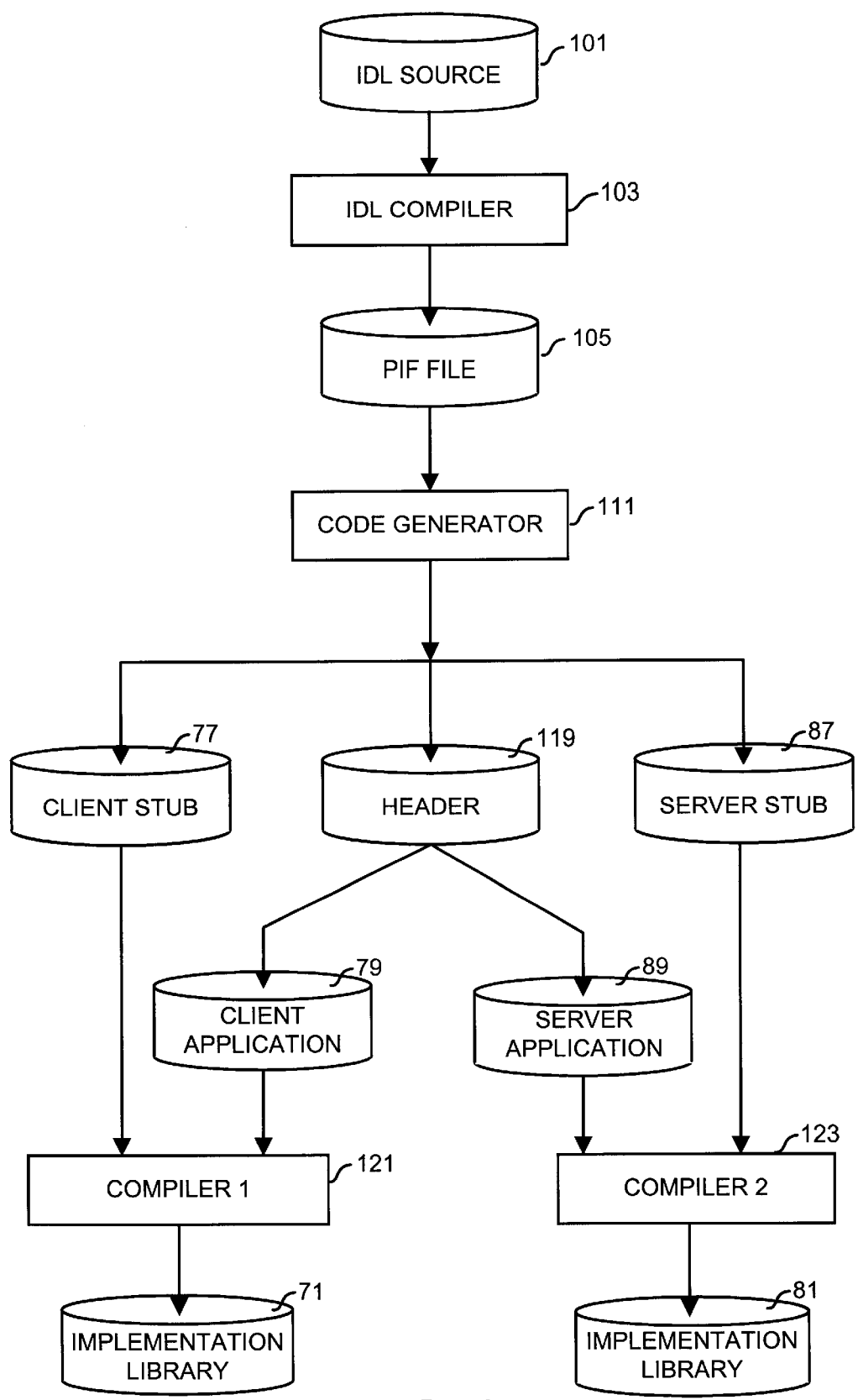
FIG. 4 is a diagram of the compilation and linking of IDL source code into client and server applications.

FIG. 4 shows how IDL source files are compiled and linked into client and server applications that will utilize the method and apparatus of the present invention. First, an IDL source file 101 is prepared containing IDL interface definitions. An IDL compiler 103 compiles the source file 101. The IDL compiler 103 parses the code 101 to produce an intermediate Pickled IDL file ("PIF") file 105 for storage of the original source file. The generation of a PIF file is described in U.S. application Ser. No. 08/678,298 entitled "Data Structure Representing An Interface Definition Language Source File" by A. Schofield, filed Jul. 11, 1996. A code generator 111 then parses the PIF file. Preferably, however, the IDL compiler and code generator are combined to generate code directly from the source file. The code generator 111 generates files in the language of the client and server applications. If the client and server applications are in different languages, different code generators 111 are used. Alternatively, the code generator 111 and the IDL compiler 103 may be combined in a single application to produce language-specific code. The code generator 111 produces a client stub file 79 containing client stub functions and a server stub file 89 containing definitions for object implementations. The client stub file 79 and the server stub file 89 are compiled by programming language-specific compilers 121, 123 to produce compiled client stub object code and compiled server stub object code. Similarly, a client application 77 and a server application 87 are compiled by programming-language-specific compilers to produce compiled client application object code and compiled server application object code. The client application 77 and the server application 87 also include a header file 119 generated by the code generator 111. The header file 119 contains common definitions and declarations. Finally, a language compiler 121 links the client application object code and the client stub object code to produce an implementation library 71. Similarly, a second language compiler 123 links the server application object code and the server stub object code to produce another implementation library 81.

IV. Asynchronous Client and Server Stub Files

The code generator 111 generates both synchronous and asynchronous client stub functions in the client stub file 79 for each operation in each interface defined in the IDL source file 101. Each stub function corresponds to a particular operation in the interface(s) defined in the IDL source file 101. The client application 77 calls these stub functions to request that an operation be performed on an object. The synchronous client stub functions receive the operation's input parameters, and a reference to the object (in the form of a proxy handle). The synchronous client stub function, in turn, contains a call to CEE_OBJECT_CALL (discussed below) which is used to make an object call through the client-side CEE. The asynchronous client stub functions receive the input parameters to a requested operation, the proxy handle, and a pointer to a completion routine address. These parameters are, in turn, passed to a CEE function, CEE_OBJECT_CALL_POST, which is also discussed in greater detail below.

The code generator 111 similarly generates synchronous and asynchronous server stub functions in the server stub file 89. Each stub function corresponds to a particular operation in the interface(s) defined in the IDL source file 101. The server application calls these stub functions to notify the CEE of which methods to up-call in order to implement the interface operation that corresponds to the stub. The synchronous server stub function for each operation receives an implementation handle (returned from the call to CEE_IMPLEMENTATION_CREATE) and the address of a method in the server application.

The synchronous server stub function, when called in the server application, calls CEE_SET_METHOD to connect the server application method to the operation specified by the stub. When requests for particular operations arrive at the server-side CEE, the CEE up-calls the appropriate method in the server application based upon the address that has been set for the requested operation. When the server application method returns, the server-side CEE will transmit a response back to the client.

The code generator 111 generates a stub function to handle asynchronous object implementation. The asynchronous server stub function is similar to the synchronous stub function, in that the asynchronous stub function receives (from the server application) the implementation handle and the address of a method to up-call from the server application. The asynchronous stub function, in turn, calls CEE_SET_METHOD, which connects the server application method to the operation corresponding to the stub. This call to CEE_SET_METHOD also notifies the CEE (via a parameter to CEE_SET_METHOD) that the method is to be implemented asynchronously. Since the up-called server application method is asynchronous, the CEE will respond to the client upon a call to a generated response stub function also contained in the server stub file 89. The generated response stub function receives the operation's output parameters and a call identifier. These parameters are passed to a CEE function, CEE_RESPOND (described below), which responds to the client application.

V. Synchronous and Asynchronous Calls and Implementations

A. Synchronous Call/Synchronous Implementation

Now, with reference to FIGS. 5–10, the method of the present invention will be described. This example assumes that a server object to be called was previously activated by the server-side CEE. As stated above, object calls may be performed synchronously or asynchronously through generated synchronous and asynchronous client stubs. Similarly, object implementations in the server application may be performed synchronously or asynchronously. The method and apparatus described herein involves separate capsules loaded on separate machines.

Figure 5:
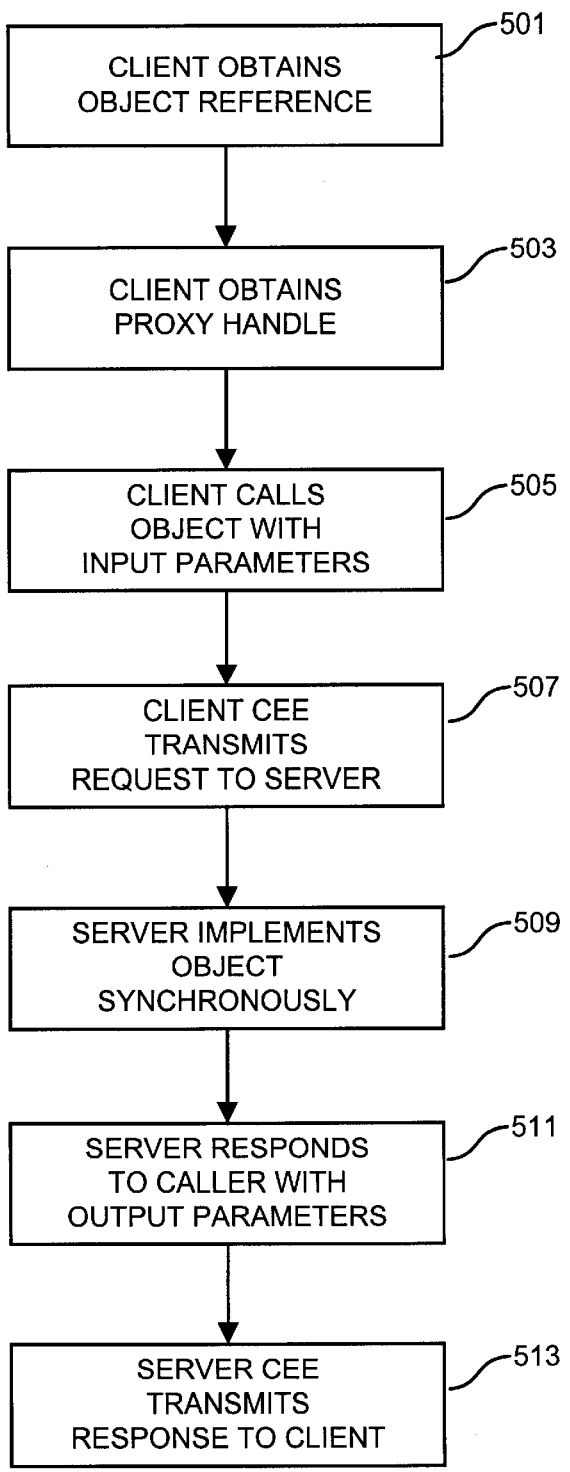
FIG. 5 is a flow chart describing the steps involved in a synchronous object call

First, a synchronous object call combined with a synchronous object implementation will be described. FIG. 5 shows a flow chart describing the steps involved in a synchronous call to an object and a synchronous implementation of the object. In a first step 501, an object reference for the desired object must be obtained by the client application. The object reference may be obtained in a number of ways. Client applications usually receive the reference from configuration data, directories or invocations on other objects to which they have object references. An object reference can be converted to a string name that can be stored in files to be accessed later.

The object call is initiated in step 503 by first obtaining a "proxy handle" to the object reference from the CEE. The proxy handle is a structure containing the object reference along with information regarding calls made to the same object. The proxy handle is designed to facilitate multiple calls to the same object without incurring the overhead that can occur in calling the object each time. By creating a proxy handle via which object calls can be made, certain initialization routines may be performed once through the proxy handle while allowing multiple simultaneous calls to the proxied object. A proxy handle is created in CEE 75 by down-calling the CEE function CEE_PROXY_CREATE from the client application. That function is defined in the C programming language as follows:

```
CEE_PROXY_CREATE (
    const char      *objref,
    const char      *intf_handle,
    char            *proxy_handle);
```

The function receives the object reference, objref, and an interface handle, intf_handle returned by CEE_INTERFACE_CREATE (described above), and returns a proxy handle identifying the newly created proxy object. The details of proxy creation and a description of the proxy handle structure returned by CEE_PROXY_CREATE is described in U.S. application Ser. No. 08/680,261 entitled "Method and Apparatus for Performing Distributed Object Calls using Proxies and Memory Allocation" by A. Schofield filed Jul. 11, 1996, which is attached as Appendix A.

The proxy handle returned by CEE_PROXY_CREATE is a structure containing a pointer to the object if the object is in the same capsule or a pointer to a client port if the object is not in the same capsule. The client-side CEE also uses the proxy to store a completion routine address that is used in an asynchronous object call (discussed below). The completion routine will be discussed below with reference to asynchronous calls from the client application. In a synchronous object call, the address of a completion routine is not stored in the proxy handle structure.

In step 505, the client calls the object. Specifically, the client application requests that an operation of an object's interface be performed on the object by calling the appropriate generated synchronous stub function which, in turn, contains a down-call to CEE_OBJECT_CALL. CEE_OBJECT_CALL is defined in C as follows:

```
CEE_OBJECT_CALL (
    const char      *proxy_handle,
    long            *operation_idx,
    void            *param_vector);
```

The stub function receives the proxy handle and the input parameters to the operation. The stub function provides CEE_OBJECT_CALL with three parameters. The first parameter is the proxy_handle. This parameter specifies the object to be called and will be used to respond to the call. The second parameter, operation_idx, is an integer that specifies which of the object's methods is to be called. The identifier is used locally by the client to specify a particular operation. The identifier saves the client the trouble of repeatedly performing string comparisons on the operation name. Similarly, on the server side, the server specifies operations using its own operation identifier. The param_vector is an array containing the addresses of the object call's input parameters, output parameters and exception structure. The address of the exception structure preferably is the first element in the array. If the operation is not of type void, then the following element in the array contains the address of the variable to receive the operation's result. The remaining elements contain the address of the operation's input and output parameters in the same order as they were defined in IDL.

In step 507, the request for the operation to be performed, including the input parameters, operation identifier, and object reference (as determined by the proxy handle), is transmitted from the client-side CEE to the server-side CEE via the CEE interface 84. As stated above, the CEE's may utilize any method of data transfer to transfer the call across systems or networks.

To implement the object synchronously, the server-side CEE 85 calls the appropriate method in the server application (as specified by the initialization routine's call to a server stub function which, in turn, called CEE_SET_METHOD). Preferably, the server-side CEE 85 provides three parameters to the method in the server application: (1) An optional call identifier that is used by the server application method to allocate and deallocate memory for the call; (2) An exception identifier to hold error information that can be returned to the caller; and (3) The input parameters to the requested operation in the order as they were originally defined in IDL. The method uses the input parameters and carries out the request in step 509. The call identifier can be used to call other CEE functions which automatically allocate and deallocate memory within the server application method, as described below in connection with FIG. 10.

If the operation requested by the client includes an output parameter, the method in the server application will initialize and modify this output parameter (if necessary) within the body of the method. Once the method completes, it returns the output parameter to the server-side CEE in step 511. The server-side CEE automatically sends the response to the calling function in the client application in step 513. The response message contains the output parameters (if any) along with optional server-side-CEE-generated exception information regarding the success or failure of the operation. The object call is then complete.

B. Asynchronous Call/Synchronous Implementation

Figure 6:
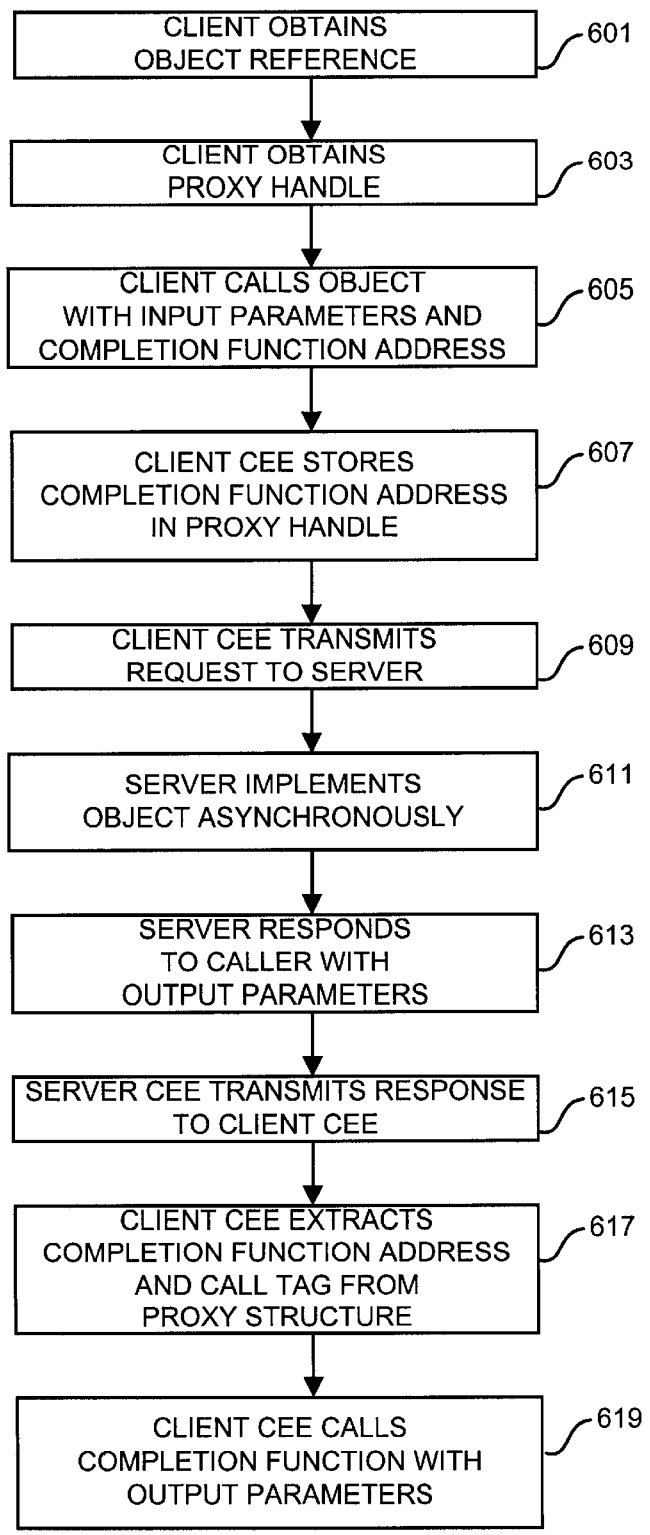
FIG. 6 is a flow chart describing the steps involved in an asynchronous object call.

FIG. 6 shows the steps necessary to perform an asynchronous object call from the client application combined with a synchronous implementation. The first few steps are similar to the steps involved in the synchronous case. In step 601, the client application obtains an object reference. In step 603, the client application creates a proxy handle for the object reference using CEE_PROXY_CREATE.

Next, in step 605, the object is called using a generated asynchronous client stub function. This generated asynchronous stub function receives the object's proxy handle, the input parameters to the operation, a call tag (described below) and the address to a "completion routine" within the client application. The completion routine will be called by the client-side CEE when a response to the object call has returned. The asynchronous stub function, in turn, down-calls a client-side CEE function, CEE_OBJECT_CALL_

POST, which calls the object. CEE_OBJECT_CALL_POST is defined in C as follows:

```
CEE_OBJECT_CALL_POST (
    const char      *proxy handle,
    long            operation_idx,
    const void      *const *param_vector,
    void            completion_routine,
    char            call_tag1);
```

The stub function provides the proxy handle for the requested object and an operation index that specifies which of the object's operations is to be performed. The param_vector parameter supplied here is an array containing the addresses of the object call's input parameters only. The input parameters are stored in the array in the same order as they were defined in IDL to permit object calls across multiple platforms. The call_tag1 parameter is a constant used to identify this call to the object.

The asynchronous client stub function and CEE_OBJECT_CALL_POST also receive the address of a "completion routine" in the client application that will be called by the client-side CEE 75 when a response to the object is returned to the client application or an error condition (or other exception) has been received by the client-side CEE. In step 607, the client-side CEE stores the completion routine address in the proxy handle for later use. When the call returns for a particular proxy handle, the client-side CEE will extract the completion routine address from the proxy structure and call the completion routine. The completion routine will be discussed below. If multiple calls are made requiring the same completion routine, the call_tag1 parameter may be used to identify a particular call within the completion routine. The call_tag1 parameter is also stored in the proxy structure in step 607.

In step 609, the request for an operation to be performed on an object is transmitted from the client-side CEE to the server-side CEE using any transport mechanism. Once the object call has been made, the client can continue performing other functions. It need not wait for a response as in the synchronous case. Moreover, the client application is not required to continuously poll the server for a response.

On the server side, the object is implemented synchronously as described above. The server-side CEE selects the appropriate method in the server application to perform the operation. The method implements the operation on the requested object in step 611 and responds to the client application in step 613. The serverside CEE transmits the response containing any output parameters and exception information to the client-side CEE in step 615.

The client-side CEE locates the proxy handle structure for the transmitted response in the client CEE capsule. In step 617, the client-side CEE extracts the completion routine address and call_tag1 identifier from the proxy structure. The client-side CEE calls the completion routine in the client application, in step 619. The client-side CEE provides the completion routine with the exception information, the output parameters of the object's methods and an optional identifier tag (as specified above by call_tag1) to identify which asynchronous call has completed (if multiple calls use the same completion routine). The completion routine in the client application can then use these parameters as necessary.

FIG. 7 shows sample code in a client application 77 that uses the method of the present invention. The client application is written in the C programming language. In this example, the client obtains the current time from an object of the Time interface (the "Time object"). The client obtains the time by requesting the performance of the Tim_Now operation on the Time object. The Tim_Now operation takes a constant (LOCAL or GMT) as an input parameter and returns the local time or Greenwich Mean Time.

At line 701, the client application includes the header file 119 generated by the code generator from an IDL source file containing the Time interface definition. The header file 119 includes the synchronous and asynchronous client (and server) stub functions for each operation in the Time interface, including the Tim_Now stub functions.

The client initialization routine is up-called by the client-side CEE 75 at line 702. The client registers the Time interface with the client-side CEE 75 at line 703 by calling an interface stub function which will call CEE_INTERFACE_CREATE. The CEE returns an interface handle, intf, to the client. (The variable sts (status) is a dummy variable that allows the function return value to be examined when debugging.)

At line 703, the client obtains an object reference from a configuration file previously registered with the CEE. The reference, objref, refers to an object of the Time interface. Because the client application plans to call TIM_Now twice and simultaneously, the client uses the object reference to create two proxy handles at lines 705 and 706. The client calls CEE_PROXY_CREATE which returns proxy and proxy1.

At line 707, the client calls the Time object using the asynchronous stub function, Tim_Now_pst. The client provides the first proxy handle (proxy), a completion routine tag (LOCAL_TIME_TAG), and an input parameter (LOCAL). At line 708, the client continues to perform other asynchronous work by making another call to the same object using a different proxy handle (proxy1), completion routine tag (GMT_TAG), and input parameter (GMT). If the first call were made synchronously, the client application would be required to wait until the first call to Tim_Now returned before making the second call to Tim_Now.

For both calls, the client-side CEE stores the completion routine address and completion routine tag in the proxy structure. The client-side CEE 75 transmits both requests to the server-side CEE 85. The server application contains an implementation for the Tim-Now operation. This implementation (not shown) provides the local or GMT time. The time is inserted into an output parameter and the output parameter and any exception information are transmitted back to the client-side CEE 75.

The client-side CEE determines which call has returned and calls the completion routine for the returning call. The completion routine of the example is shown beginning at line 709. A switch statement at line 710 receives the optional completion routine tag parameter. If the tag value is LOCAL, the function will print the local time as shown at line 711–712. If the tag value is GMT, the function prints the GMT time as shown at line 713–714. Another example of a completion routine tag would be that the CEE assigns sequential tag numbers each time it makes a new function call to an object.

B. Asynchronous Implementation

Figure 8:
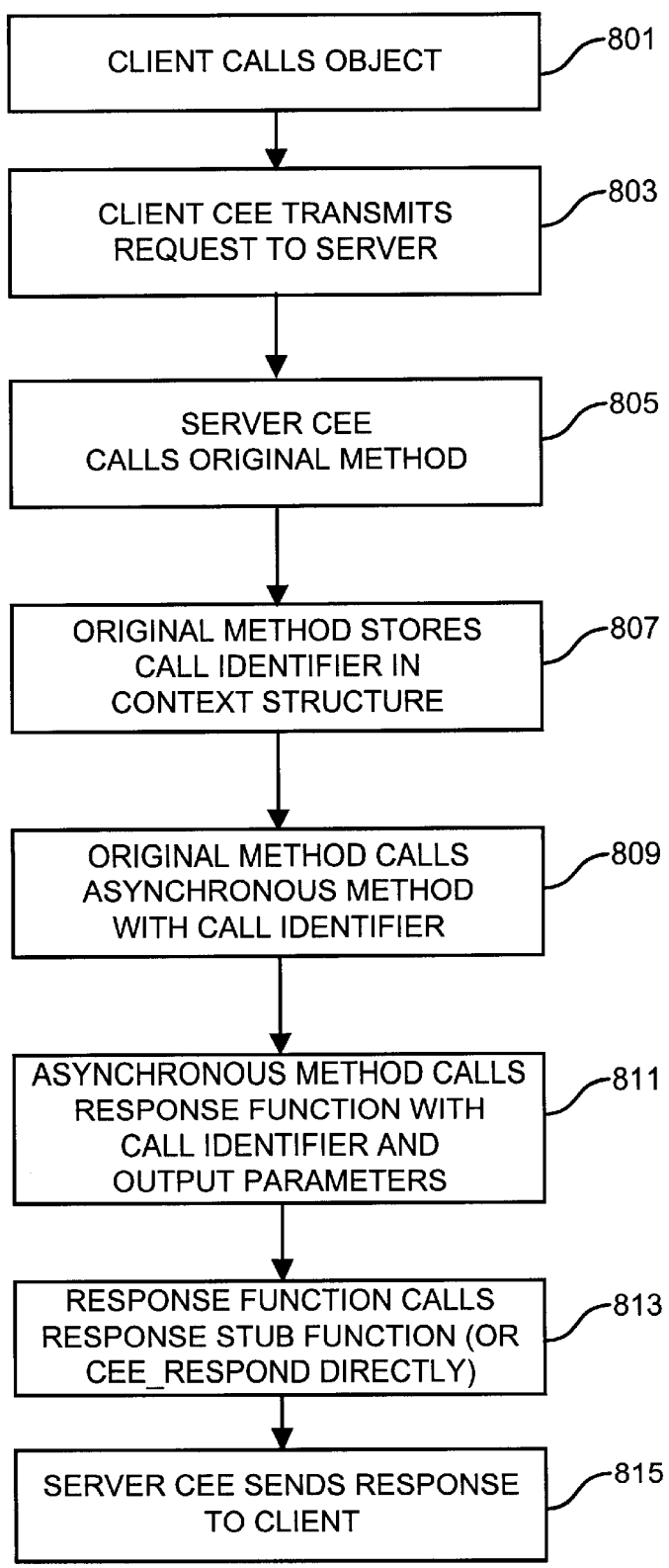
FIG. 8 is a flow chart describing the steps involved in an asynchronous invocation of an object.

Next, with reference to FIG. 8, the asynchronous implementation of an object by the server application will be described. Asynchronous implementation involves an original method in the server application calling a second asynchronous method. The original method may be called by the client synchronously or asynchronously. The method described herein allows an object to support more than one concurrent request. In a first step 801, the client calls the object and requests that an operation be performed on the object. The object call, as discussed above, may, itself, be synchronous or asynchronous. If the call is synchronous and the implementation of the object is asynchronous, however, the client and the object must be running in different capsules in an MSF system. This discussion assumes that the client application and server applications are running in separate capsules on different machines. In step 803, the call is transmitted from the client-side CEE to the server-side CEE via interface 84 using any known transport mechanism.

On the server side, the CEE calls the appropriate server application method for the requested operation in step 805. This method (hereinafter called the "original method") was specified as the appropriate method for the requested operation by a call to an asynchronous stub function from the initialization routine, as discussed above. The CEE provides the original method in the server application with the same parameters as in the synchronous case: (1) A call_id parameter; (2) An exception parameter used to track errors in implementing the object; and (3) The input parameters to the operation. In the asynchronous case, however, the call identifier provided to the server application method is stored by the server-side CEE in the server computer memory 17. Since the server-side CEE will respond to the client-side CEE upon a call to CEE_RESPOND (rather than automatically upon a return from the original method), the server-side CEE will track each call with a different call identifier. Accordingly, the original method, any asynchronous methods that are called from the original method, and the response function (discussed below) must also keep track of the call identifier. Within the original method, in step 807 a context variable is preferably used to store the call identifier passed to the original method. The context variable is also used to store the output parameters containing the result of any operations performed by the method. The context variable will be passed to the asynchronous method called from the original method. Each time, the CEE up-calls the original method, a new context variable is created.

In step 809, the original method calls an asynchronous method to carry out another function. For example, the original method may need to perform an asynchronous input/output operation such as opening or closing a disk file. Alternatively, the original method may make an asynchronous object call, itself, to carry out some function. If the original method calls an asynchronous method, the original method preferably provides the asynchronous method with the address of a response function in the server application. When the asynchronous method completes, the asynchronous method will call the response function. In addition, the asynchronous method receives the context variable containing the call identifier and the result of any operations performed in the original method. The context parameter will ultimately be used by the response function in order to associate the response to a particular object call.

The asynchronous method performs its designated function. When completed, the asynchronous method calls a response function in step 811. The asynchronous method passes the context parameter containing the call identifier and output parameters (as well as any other context that may be useful) to the response function. The response function, in turn, calls the asynchronous response stub function in the server application in step 813. As discussed above, the response stub function contains a down-call to CEE_RESPOND. If the original method had not called an asynchronous method, but was specified as an asynchronous method in the initialization routine, the original method could have called the asynchronous response stub function directly. Alternatively, any method in the server application can call CEE_RESPOND. CEE_RESPOND is defined in C as follows:

```
CEE_RESPOND (
    const char       *call_id,
    const void       *const *param_vector);
```

The response function transmits the call identifier to the stub function by extracting the call identifier from the context. The stub function transmits the identifier to CEE_RESPOND. The server-side CEE locates the call identifier in the server computer memory and responds to the appropriate call based upon the call identifier. The response contains the param-vector parameter which is an array containing pointers to the object call's output parameters and exception structure. The first element of the array is the address of the exception structure. If the operation is not of type void, then the next element contains the address of the variable containing the operation's result. Subsequent elements contain the addresses of the operation's output parameters in the same order as they were defined in IDL.

In step 815, the response is sent back to the client-side CEE via interface 84. The client-side CEE up-calls the appropriate method in the client application and provides the output parameters and exception information from the call to CEE_RESPOND.

FIG. 9 shows sample code in a C-language server application that implements objects asynchronously. This example contains a possible implementation for the object call shown in FIG. 7. This code contains an asynchronous implementation of a Tim_Now operation on an object of the Time interface. (Data type definitions have been omitted).

The server-side CEE 85 calls the server application's initialization routine when the implementation libraries are loaded. The routine, beginning at line 901, obtains an interface handle by calling a server stub function at line 902. The interface handle is used to create an implementation handle at line 903 which, in turn, is passed to a server stub for setting the address for a method in the server application. At line 904, the address for the server method, NowMethod, is specified as the method to be up-called by the server-side CEE for the Tim_Now operation. Moreover, by calling an asynchronous stub function to set the address, server application notifies the server-side CEE that a call to CEE_RESPOND is required before responding to the client (rather than responding automatically upon exiting the up-called method). Further, the server-side CEE 85 will pass a call identifier into the method to identify the call.

When a call for TIM_Now arrives at the server-side CEE, the CEE up-calls NowMethod(the original method) in the server application. At line 905, NowMethod converts the time to the requested time zone and stores it in a variable, timeptr. At lines 906–907, the method stores the result in a predefined context structure. At line 908, this structure is also used to store the call identifier passed into the method at line 920.

At line 909, the original method (NowMethod) calls an asynchronous method. In this example, the asynchronous method is a trivial down-call to a CEE timer function. The CEE timer method receives the context structure and the address of a response function, TimerExpired, in the server application. The CEE will call the response function when the timer "pops" after one second. Execution on the server side continues after the call of line 909 without waiting for control to return from CEE_TIMER_CREATE.

When the timer pops, the CEE calls the response function, TimerExpired. TimerExpired, at line 910, contains a single call to a server stub response function. The server stub response function, preferably, calls CEE_RESPOND. The call to the server stub response function extracts the call identifier and the output parameter, timestr. The server-side CEE transmits the output parameter (and exception information, if any) back to the client-side CEE 75, in a manner dependent on whether the original call was made synchronously or asynchronously.

C. Asynchronous Implementation with Memory Allocation

Figure 10:
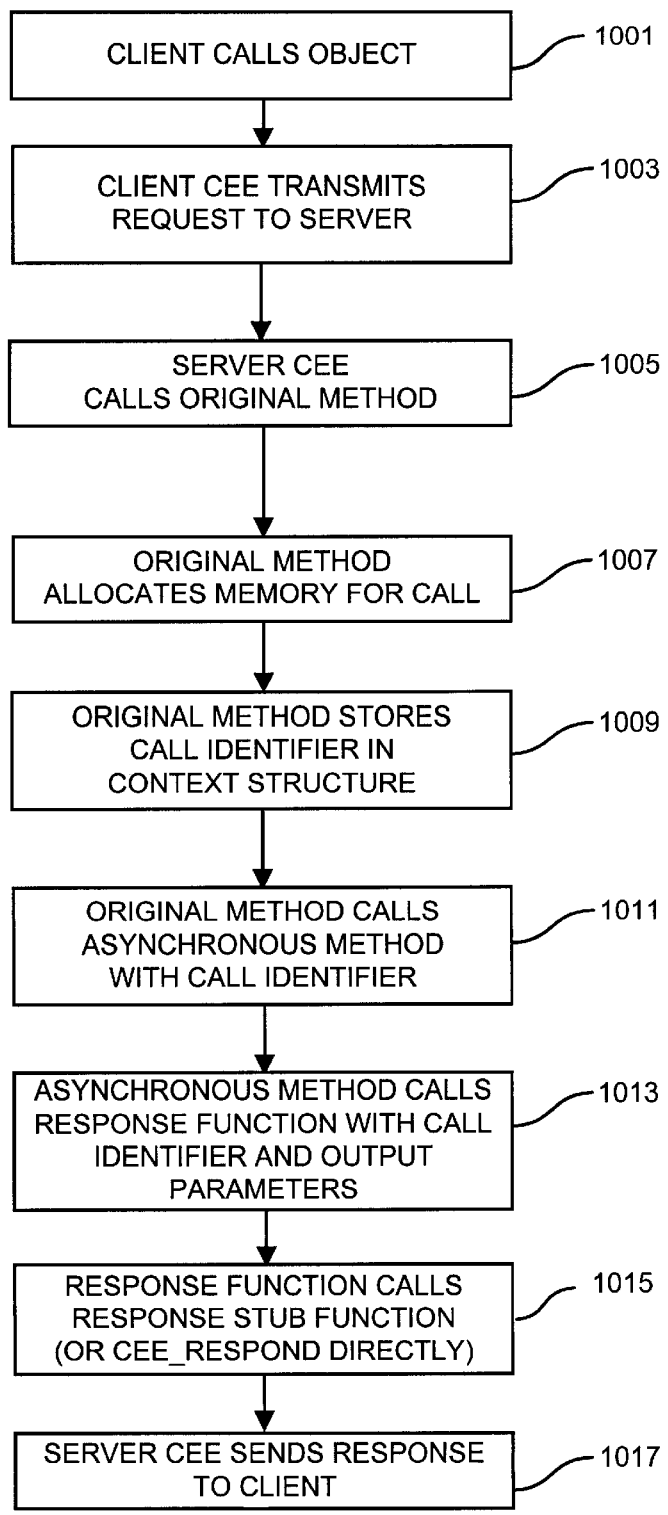
FIG. 10 is a flow chart describing a second embodiment of the method of the present invention.

Because multiple calls can be made to the same method in the server application, the method should preferably have some method for allocating and deallocating memory for numerous calls. In an alternative embodiment of the method and apparatus of the present invention, memory allocation and deallocation ("garbage collection") during object implementation is provided. FIG. 10 shows this alternative method of the present invention. Steps 1001–1005 are similar to the steps involved in FIG. 6. Thus, in step 1001, the object is called asynchronously or synchronously. Next, in step 1003, the request is transported from the client-side CEE to the server-side CEE. The server-side CEE then up-calls the appropriate method in the server application in step 1005.

In step 1007, the server application allocates memory for the call. This is accomplished by calling an appropriate memory allocation function, such as MALLOC in C and C++. A mechanism must also be provided to deallocate previously allocated resources. Preferably, memory allocation and deallocation is performed by down-calling CEE_TMP_ALLOCATE, defined in C as follows:

```
CEE_TMP_ALLOCATE (
    const char      *call_id
    long            len
    void            **ptr
```

The call_id parameter identifies the particular call so that the CEE can automatically deallocate the memory upon completion of the call. The len parameter specifies the number of bytes to allocate. The CEE returns the address of the allocated memory using the ptr parameter.

Next, the method is performed and the result and call_id are stored in the context variable in step 1009. The method then calls an asynchronous method (or object call) in step 1011. The asynchronous operation performs its functions and then calls the response function in step 1013. The response function, in turn, calls a server stub response function in step 1015. The output parameters to the operation along with any exception information indicating the success or failure of the object call are sent back to the caller in step 1017.

Having thus described a preferred embodiment of a method for asynchronously calling and invoking objects, it should be apparent to those skilled in the art that certain advantages of the within system have been achieved. It should also be appreciated that various modifications, adaptations, and alternative embodiments thereof may be made within the scope and spirit of the present invention. For example, a method has been illustrated, but it should be apparent that the inventive concepts described above would be equally applicable to a non-MSF environment. The invention is further defined by the following claims.

What is claimed is:

1. A method for asynchronously performing an operation on an object, the operation being requested by a client application to a server application, the method comprising the steps of:

maintaining a non-threaded execution environment accessible to the client application and the server application, the environment associated with asynchronously performing the operation;

obtaining an object reference to the object in the client application;

requesting the operation with a stub function in the client application, the stub function being passed the object reference, an input parameter of the operation, and a computer memory address of a completion routine in the client application;

storing the completion routine memory address;

transmitting the input parameter to a method in the server via the non-threaded execution environment;

asynchronously implementing the operation on the object server application, the implementation including a response to the client application;

transmitting the response to the client application via the non-threaded execution environment; and calling the completion routine in the client application, the routine being passed the response.

2. The method for performing an operation on an object, as recited in claim 1, wherein the object reference is obtained from a configuration file accessible to the client application.

3. The method for performing an operation on an object, as recited in claim 1, wherein the object reference is obtained from a disk file accessible to the client application.

4. The method for performing an operation on an object, as recited in claim 1, wherein the object reference is obtained from a previous object call by the client application.

5. The method for performing an operation on an object, as recited in claim 1, wherein the step of asynchronously implementing the operation on the object further comprises the steps of:

calling an asynchronous function from within the server application method, the asynchronous function being passed a call identifier and a memory address containing a response function in the server application;

calling the response function from the asynchronous function, passing the call identifier to the response function; and responding to the object call based upon the identifier.

6. A method for asynchronously performing an operation on an object via a request by a client computer application to a server computer application, the method comprising the steps of:

maintaining a non-threaded execution environment accessible to the client application and the server application, the environment associated with asynchronously performing the operation;

obtaining an object reference to represent the object;

calling the object with a stub function in the client application, the stub function being passed the object reference, an input parameter of the operation, and a client computer memory address of a completion routine in the client application;

transmitting the input parameter and object reference to a method in the server application via the non-threaded execution environment;

calling an asynchronous function from within the method, passing a call identifier and a server computer response function memory address to the asynchronous function;

calling the response function from the asynchronous function, passing the call identifier to the response function;

responding to the object call based upon the identifier;

transmitting the response to the caller via the non-threaded execution environment; and calling the completion routine, the completion routine being passed the response.

7. A method for asynchronously performing an operation on an object via a request by a client computer application to a server computer application, the method comprising the steps of:

maintaining a non-threaded execution environment accessible to the client application and the server application, the environment associated with asynchronously performing the operation;

obtaining an object reference to represent the object;

creating a proxy handle to represent the object reference;

calling the object with a stub function in the client application, the stub function being passed the proxy handle, an input parameter of the operation, and a client computer memory address to a completion routine in the client application;

transmitting the input parameter to the server application via the non-threaded execution environment based upon the proxy handle;

asynchronously implementing the operation on the object server application, the asynchronous implementation including a response to the client application;

transmitting the response to the client application via the non-threaded execution environment; and calling the completion routine in the client application, the completion routine being passed the response.

8. The method for performing an operation on an object, as recited in claim 5, wherein the object reference is obtained from an initialization routine in the client application.

9. The method for performing an operation on an object, as recited in claim 5, wherein the object reference is obtained from a disk file.

10. The method for performing an operation on an object, as recited in claim 5, wherein the object reference is obtained from a previous object call.

11. A computer program product, comprising:

a computer useable medium having computer readable code means embodied therein for performing an operation on an object via a request from a client computer application to a server computer application, the computer readable program code means comprising:

software means for maintaining a non-threaded execution environment accessible to the client application and the server application, the environment associated with performing the operation;

software means for obtaining an object reference to represent the object;

software means for calling the object with a stub function in the client application, the stub function being passed the object reference, an input parameter of the operation, and a client computer memory address to a completion routine in the client application;

software means for transmitting the object reference, input parameter, and completion routine address to the non-threaded execution environment;

software means for transmitting the input parameter to a method in the server application via the non-threaded execution environment based upon the object reference;

software means for asynchronously implementing the operation on the object in the server application, the implementation including a response to the client application;

software means for transmitting the response to the client application via the execution environment; and software means for calling the completion routine in the client application, the completion routine being passed the response.

12. The computer program product, as recited in claim 11, wherein the software means for asynchronously implementing the operation on the object in the server application further comprises:

software means for calling an asynchronous function from within the server application method, passing a call identifier and a response function address to the asynchronous function;

software means for calling the response function from the asynchronous function, passing the call identifier to the response function; and software means for responding to the object call based upon the identifier.

* * * * *

UNITED STATES PATENT AND TRADEMARK OFFICE
CERTIFICATE OF CORRECTION

PATENT NO. : 6,253,252 B1
DATED : June 26, 2001
INVENTOR(S) : Andrew Schofield

It is certified that error appears in the above-identified patent and that said Letters Patent is hereby corrected as shown below:

Drawings,
Sheet 1, Fig. 1, the reference numeral -- 42 -- should be applied to the box element labeled Display Device.

Sheet 2, Fig. 2A, the reference numeral 81 should be applied to the box element encompassing the upper CEE and Client Application elements; delete the reference numeral "85"; the reference numeral -- 50 -- should be applied to the box element encompassing the lower CEE and Server Application elements; delete the reference numeral "21" and insert in its place reference numeral -- 44 --.

Sheet 2, Fig.2B, delete the reference numeral "21" and insert in its place reference numeral -- 46 --.

Fig. 3 and Fig. 4, the reference numeral 79 should be applied to the element labeled Client Stubs; the reference numeral 77, should be applied to the element labeled Client Application.

Sheet 4, Fig. 4, the reference numeral 89 should be applied to the element labeled Server Stub; the reference numeral 87 should be applied to the element labeled Server Application.

Column 5,
Line 10, delete "33" and insert in its place -- 42 --.

Claim 8,
Line 37, delete "5" and insert in its place -- 7 --.

Claim 9,
Line 41, delete "5" and insert in its place -- 7 --.

UNITED STATES PATENT AND TRADEMARK OFFICE
CERTIFICATE OF CORRECTION

PATENT NO. : 6,253,252 B1
DATED : June 26, 2001
INVENTOR(S) : Andrew Schofield

It is certified that error appears in the above-identified patent and that said Letters Patent is hereby corrected as shown below:

Claim 10,
Line 43, delete "5" and insert in its place -- 7 --.

Signed and Sealed this

Twenty-third Day of April, 2002

*Attest:*

*Attesting Officer*

JAMES E. ROGAN
*Director of the United States Patent and Trademark Office*